US008331269B2

(12) United States Patent
Li et al.

(10) Patent No.: US 8,331,269 B2
(45) Date of Patent: Dec. 11, 2012

(54) METHOD AND DEVICE FOR TRANSMITTING VOICE IN WIRELESS SYSTEM

(75) Inventors: Hang Li, Beijing (CN); Guanghan Xu, Beijing (CN); Yongquan Qiang, Beijing (CN); Hui Zhou, Beijing (CN); Qiang Ma, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 243 days.

(21) Appl. No.: 12/682,518

(22) PCT Filed: Oct. 9, 2008

(86) PCT No.: PCT/CN2008/072628
§ 371 (c)(1),
(2), (4) Date: Apr. 9, 2010

(87) PCT Pub. No.: WO2009/049536
PCT Pub. Date: Apr. 23, 2009

(65) Prior Publication Data
US 2010/0220677 A1 Sep. 2, 2010

(30) Foreign Application Priority Data
Oct. 9, 2007 (CN) .......................... 2007 1 0175617

(51) Int. Cl.
*H04L 12/66* (2006.01)
*H04W 4/00* (2009.01)
*G06F 15/173* (2006.01)

(52) U.S. Cl. ......... 370/278; 370/329; 370/352; 709/224

(58) Field of Classification Search .......... 370/252–328, 370/356–363, 437–439; 455/423–452, 509–557; 709/224–229, 233–238
See application file for complete search history.

(56) References Cited

U.S. PATENT DOCUMENTS
5,892,794 A * 4/1999 Slegers .......................... 375/219
(Continued)

FOREIGN PATENT DOCUMENTS
CN 1168215 A 12/1997
(Continued)

OTHER PUBLICATIONS
International Search Report from P.R. China in International Application No. PCT/CN2008/072628 mailed Jan. 15, 2009.

*Primary Examiner* — Man Phan
(74) *Attorney, Agent, or Firm* — Finnegan, Henderson, Farabow, Garrett & Dunner, L.L.P.

(57) ABSTRACT

Embodiments of the present invention provide a method and device for transmitting voice in a wireless system. The method includes: identifying, by a transmitter, each original voice encoding packet needed to be sent out with a number indicating playback order, and performing channel encoding on each identified original voice encoding packet to construct a voice session packet; establishing a voice session or voice data mixed session between the transmitter and a receiver; allocating a channel dynamically for the voice session or the voice data mixed session; sending, by the transmitter, newly-arrived voice session packets, delayed voice session packets, voice session packets needed to be re-transmitted, data session packets and control command packets according to pre-configured priority; receiving and detecting, by the receiver, the voice session packets, sending an NACK packet comprising number of a lost voice session packet to the transmitter to inform the transmitter to re-transmit the voice session packet, if it is confirmed that the voice session packet is lost; and putting voice session packets properly received into a jitter buffer controller at the receiver if the receiver is a terminal. In embodiments of the present invention, spectral efficiency and reliability of real-time voice services in a wireless multi-service transmission system may be improved while satisfying the Quality of Service (QoS) requirements of real-time services, such as voice service.

16 Claims, 6 Drawing Sheets

U.S. PATENT DOCUMENTS

| | | | | |
|---|---|---|---|---|
| 6,363,065 B1* | 3/2002 | Thornton et al. | | 370/352 |
| 6,512,746 B1* | 1/2003 | Sand | | 370/252 |
| 6,665,293 B2* | 12/2003 | Thornton et al. | | 370/352 |
| 7,010,300 B1* | 3/2006 | Jones et al. | | 455/439 |
| 7,072,961 B1* | 7/2006 | Maclean et al. | | 709/224 |
| 7,246,057 B1* | 7/2007 | Sundqvist et al. | | 704/219 |
| 7,359,324 B1* | 4/2008 | Ouellette et al. | | 370/230 |
| 7,570,670 B2* | 8/2009 | Schwartz | | 370/516 |
| 7,697,447 B2* | 4/2010 | Harris | | 370/252 |
| 7,903,643 B1* | 3/2011 | Concepcion | | 370/356 |
| 7,924,815 B2* | 4/2011 | McRae et al. | | 370/352 |
| 8,081,622 B2* | 12/2011 | Makiuchi et al. | | 370/352 |
| 2003/0115320 A1* | 6/2003 | Yarroll et al. | | 709/224 |
| 2004/0203825 A1* | 10/2004 | Daniel et al. | | 455/452.1 |
| 2007/0064604 A1* | 3/2007 | Chen et al. | | 370/230 |
| 2007/0133430 A1* | 6/2007 | Kim et al. | | 370/252 |
| 2007/0206645 A1* | 9/2007 | Sundqvist et al. | | 370/516 |
| 2010/0254306 A1* | 10/2010 | Kitaji et al. | | 370/328 |
| 2010/0254307 A1* | 10/2010 | Yokota | | 370/328 |

FOREIGN PATENT DOCUMENTS

| | | |
|---|---|---|
| CN | 1332545 A | 1/2002 |
| CN | 1541470 A | 10/2004 |

* cited by examiner

METHOD AND DEVICE FOR TRANSMITTING VOICE IN WIRELESS SYSTEM

TECHNICAL FIELD

The present invention relates to wireless communication technologies, and more particularly, to a method and device for transmitting voice in a wireless communication system.

BACKGROUND OF THE INVENTION

In a wireless communication system with Internet Protocol (IP)-based multi-service transmission, wireless resources between a terminal and a base station may be shared by various services of the terminal, to reasonably utilize the wireless resources. The base station may dynamically allocate resources for various services in a scheduling manner according to the Quality of Service (QoS) of the services and link quality, etc. Since most of conventional Voice over Internet Protocol (VOW) adopts a User Datagram Protocol (UDP)-based Real-time Transport Protocol/Real Time Control Protocol (RTP/RTCP) voice encapsulation mode, to provide a real-time voice transmission from end to end. However, the transmission mode leads to very low transmission efficiency for low-rate voice encoding, such as G.729 series. While, for the wireless system, air resources are greatly wasted by the low spectral efficiency. Thus, it is very important to specially encapsulate voice packets and reasonably allocate the air resources. In such a case, resources of voice services may be occupied by an air interface link control message (e.g., resource configuration changing message) with higher priority, resulting in that the current voice packet can not be sent out in time. Thus, voice services with higher real-time requirements are affected. In addition, improper reception or loss of voice packets at a receiver may be caused by unreliable wireless channels.

SUMMARY OF THE INVENTION

Embodiments of the present invention provide a method and device for transmitting voice in a wireless system, to guarantee real-time transmission of voice services and improve reliability of voice transmission.

Embodiments of the present invention provide a method for transmitting voice in a wireless system, including:

identifying, by a transmitter, each original voice encoding packet needed to be sent out with a number indicating playback order, and performing channel encoding on each identified original voice encoding packet to construct a voice session packet;

establishing a voice session or voice data mixed session between the transmitter and a receiver;

allocating a channel dynamically for the voice session or the voice data mixed session;

sending, by the transmitter, newly-arrived voice session packets, delayed voice session packets, voice session packets needed to be re-transmitted, data session packets and control command packets according to pre-configured priority;

receiving and detecting, by the receiver, the voice session packets, sending an NACK packet comprising number of a lost voice session packet to the transmitter to inform the transmitter to re-transmit the voice session packet, if it is confirmed that the voice session packet is lost; and putting voice session packets properly received into a jitter buffer controller at the receiver if the receiver is a terminal.

Embodiments of the present invention also provide a device for transmitting voice in a wireless system, including:

a packet encapsulation unit set in a base station and a terminal, adapted to identify each original voice encoding packet needed to be sent out with a number indicating playback order, and perform channel encoding on each identified original voice encoding packet to construct a voice session packet;

a voice session packet retransmission generator set in the base station and the terminal, adapted to generate at least one voice session packet needed to be re-transmitted;

a channel allocation unit set in the base station, adapted to exchange a voice session establishment request message with the terminal to establish a voice session or a voice data mixed session, and dynamically allocate a channel;

a sending-packet scheduling unit set in the base station and the terminal, adapted to send newly-arrived voice session packets, delayed voice session packets, voice session packets needed to be re-transmitted, data session packets and control command packets according to pre-configured priority;

a voice packet detection unit set in the base station and the terminal, adapted to receive and detect the voice session packets, notify an NACK packet generator of a lost voice session packet if it is confirmed that the voice session packet is lost, and the voice packet detection unit set in the terminal is adapted to send voice session packets properly received to a jitter buffer controller; and the NACK packet generator set in the base station and the terminal, adapted to generate an NACK packet comprising number of the lost voice session packet, and send the NACK packet to a transmitter, a voice session packet sent from which is the lost voice session packet to instruct the transmitter to retransmit the voice session packet.

In view of the above, in the method and device for transmitting voice provided by embodiments of the present invention, by using retransmission mechanism, dynamic channel allocation and delay jitter buffering mechanism for special-encapsulated voice packets, spectral efficiency and reliability of real-time voice services in a wireless multi-service transmission system may be improved while satisfying the Quality of Service (QoS) requirements of the real-time services.

BRIEF DESCRIPTIONS OF THE DRAWINGS

EMBODIMENTS OF THE INVENTION

The present invention is further described in detail hereinafter with reference to the accompanying drawings to make the objective, technical solution and merits thereof more apparent. It should be understood that the specific embodiments described here are only used for describing the invention, rather than limiting the present invention.

Figure 1:
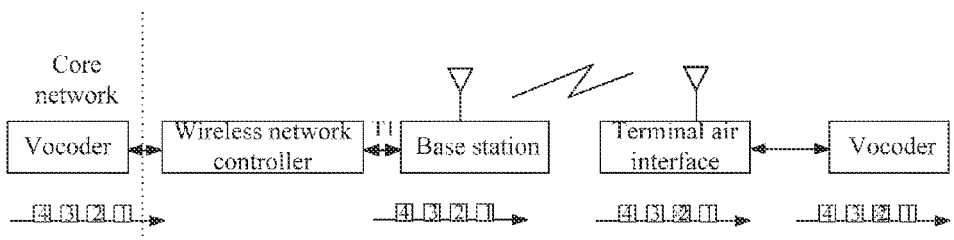
FIG. 1 is a schematic diagram illustrating a voice transmission model in a conventional wireless communication system.

In a wireless communication system, each information bit streaming encoding block is converted into a signal waveform and then put into a frame for transmission. Due to inherent real-time performances and bandwidth invariance of voice services, a fixed channel is generally adopted to transmit voice encoding packets in the voice transmission mode of the conventional wireless communication system. The channel may adopt a fixed encoding and modulation mode, and the changing of the channel is responded by controlling transmission power. In the conventional wireless communication system, one voice packet in each frame arrives at the transmitter periodically. One voice packet in each frame is strictly transmitted via an air channel. The transmission order and playback order of the voice packet must be the same. FIG. 1 is a schematic diagram illustrating a voice transmission model in a conventional wireless communication system. FIG. 1 provides an example of a downlink voice transmission. As shown in FIG. 1, it can be seen that a packet from a vocoder is delivered to a base station through a wireless network controller and a T1 link. The arrival time and order of packets are fixed. However, the wireless channel may cause packet error. In FIG. 1, it is detected that a bit error occurs in packet two when packets are transmitted via an air interface, thus packet two is discarded. If voice packets are frequently discarded, voice quality will decline.

Figure 2:
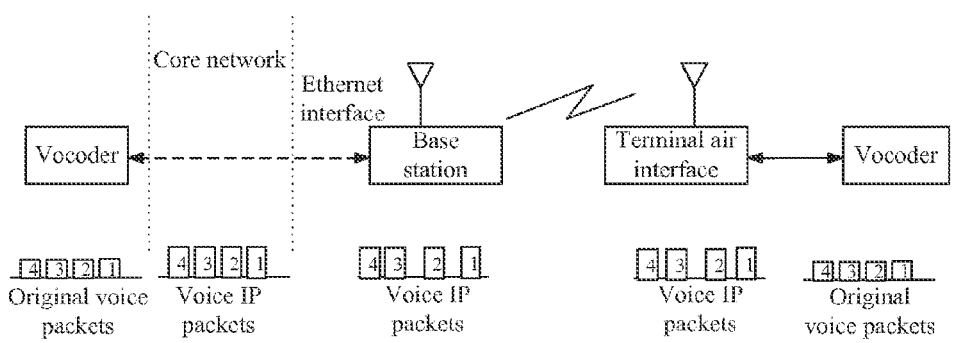
FIG. 2 is a schematic diagram illustrating a typical voice transmission model in an all-IP-service wireless communication system.

With reference to a typical all-IP wireless system, each voice packet is packaged into a voice IP packet in the core network. Since most of the conventional VOID systems adopt a RTP/RTCP voice encapsulation technology based on the UDP transmission protocol, to provide a real-time voice transmission from end to end. Additional overhead caused by this transmission mode may lead to a very low transmission efficiency for low rate voice encoding, e.g., G.729 series. FIG. 2 is a schematic diagram illustrating a voice transmission model in a typical all-IP-service wireless communication system. In FIG. 2, additional delay jitter may be caused when each voice IP packet is transmitted in a network. In a wireless access network, a voice IP packet is transmitted via an air interface as a data service. With reference to the air packet loss, relative high voice quality may be obtained based on an Automatic Repeat Request (ARQ) mechanism adopted by a wireless data transmission system and a jitter buffer control adopted by the playback of voice IP packets. However, due to the overhead generated by a voice IP packet header, relatively high voice quality is obtained at an expense of relatively high wireless resource waste. FIG. 2 shows such a voice IP packet transmission system.

Figure 3:
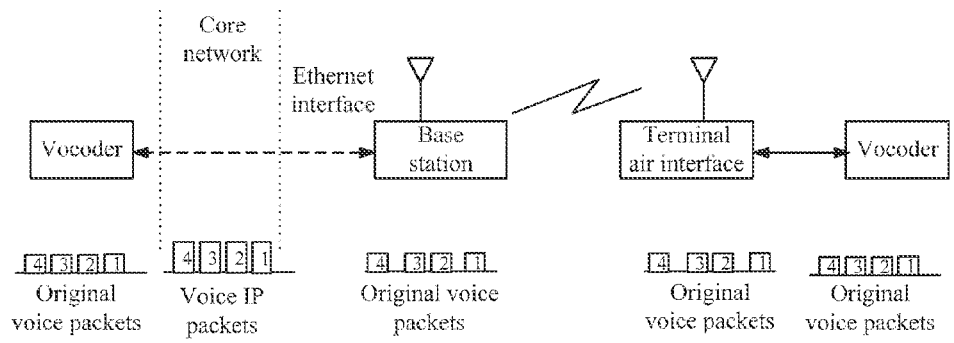
FIG. 3 is a schematic diagram illustrating an improved voice transmission model in an all-IP-service wireless communication system in accordance with an embodiment of the present invention.

FIG. 3 is a schematic diagram illustrating an improved voice transmission model in an all-IP-service wireless communication system in accordance with an embodiment of the present invention. In the embodiment of the present invention, the wireless communication system is still an all-IP wireless system. Once a voice IP packet enters into a wireless access system, the IP header of the voice IP packet is removed. Only a voice session packet generated by specially encapsulating the original voice encoding packet is transmitted via an air interface. Then, the voice packet may be transmitted with less radio resources. FIG. 3 shows such an improved voice IP packet transmission system. In order to ensure the voice quality under channel fading conditions, an ID number is added to each original voice encoding packet. Retransmission of the voice encoding packet may be achieved using the ID number. And then, a voice session packet is formed after performing channel encoding on each voice encoding packet with an ID number. The length ratio of the original voice encoding packet and the voice session packet is not less than 0.70. The receiver will detect whether the voice session packet is properly received. If the voice session packet is lost because of the channel fading, the ID number of the voice session packet will be fed back to the transmitter to request for retransmission. The loss of multiple voice session packets may be detected. Then, ID numbers of all the lost voice session packets will be fed back to the transmitter to request for the retransmission of the multiple voice session packets.

Figure 4:
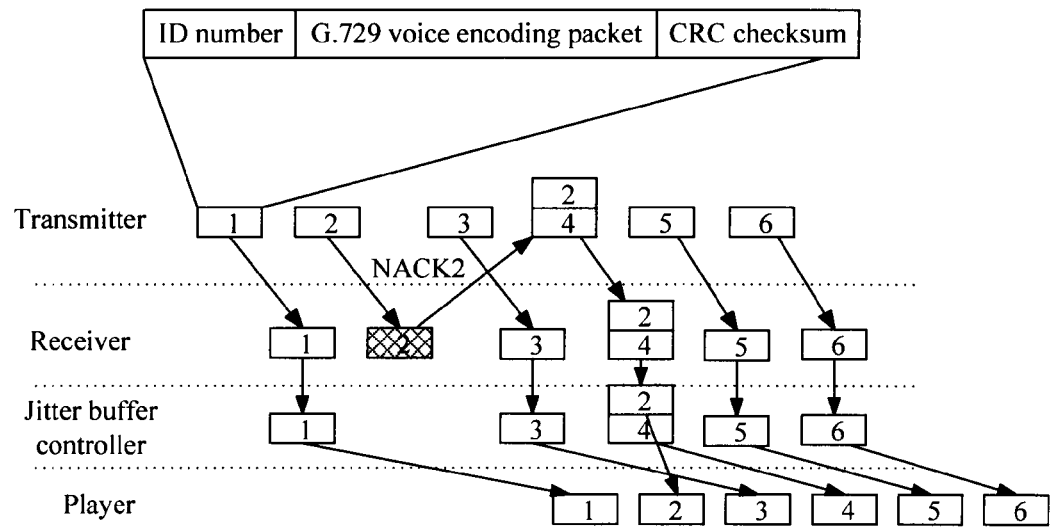
FIG. 4 is a schematic diagram illustrating an improved transmission format and transmission process of voice session packets in accordance with an embodiment of the present invention.

FIG. 4 is a schematic diagram illustrating an improved transmission format and transmission process of a voice session packet in accordance with an embodiment of the present invention. In the embodiment of the present invention, an ID number and a Cyclic Redundancy Check (CRC) checksum are added to each G.729 voice encoding packet before the voice encoding packet is transmitted. A voice session packet is formed after performing channel encoding on each voice encoding packet with an ID number added. The receiver detects that the second voice session packet is lost, and then an NACK message including the ID number of the second voice session packet may be sent to the transmitter. The transmitter receives the NACK message before sending the fourth packet, and then automatically sends the second and the fourth packets simultaneously. In this way, permanent delay will not be introduced. The receiver further includes a jitter buffer controller, which mainly controls playback delay of each voice session packet and performs necessary re-ordering on received voice session packets. Thus, the outputted voice encoding packets may be replayed in a proper order and a normal voice speed. To maintain a normal playback speed, it is necessary to insert one or more synthetic voice encoding packets when at least one outputted voice encoding packet is lost. It is also necessary to discard one or more voice encoding packets when the outputted voice encoding packets are in congestion.

The all-IP wireless system supports co-transmission of data and voice. Thus, each frame may need to transmit a voice session packet and a data session packet. In one embodiment of the present invention, if there is no enough bandwidth to transmit all the data, the available bandwidth is always first used for transmitting the voice session packet.

To make the voice transmission between the transmitter and the receiver be synchronous, it is necessary to send the ID number of the first voice session packet to the other party at the beginning of the voice session or the voice data mixed session, so that the other party may be able to properly detect the received voice session packets. Once it is confirmed that a voice session packet is lost, retransmission will be initialized. In the embodiment of the present invention, the loss of voice session packet may be confirmed by using a receiving Signal to Noise Ratio (SNR) or an error detection code checksum.

Figure 5:
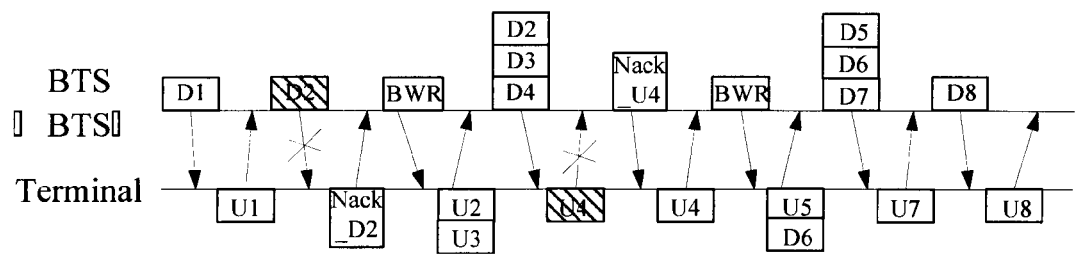
FIG. 5 is a schematic diagram illustrating an improved voice session packet transmission and dynamic channel allocation in accordance with an embodiment of the present invention.

Since in the actual channels, interference and propagation characteristics of each channel may change. The optimal approach is to adjust allocated channel number, channel location, and corresponding modulation and encoding mode in real time, to make the channel in the best condition. To achieve the above objective, the base station needs to send a bandwidth re-allocation command to a terminal. The base station sends the bandwidth re-allocation command to the terminal, instructing to increase uplink or downlink bandwidth. The increased bandwidth will be automatically cancelled after the voice session packets needed to be re-transmitted are sent out, and the base station needs not to send an extra control command packet to the terminal. In one embodiment of the present invention, the base station sends the re-allocation command to the terminal utilizing the channel allocated to the service packets. The re-allocation command is called in-band signaling. If the service packets merely include voice session packets, the transmission of one or more voice session packets must be delayed to transmit signaling messages in time. Since the re-allocation command needs to be sent periodically. Thus, the arrival time of the voice session packets at the receiver may be postponed. When transmission of the voice session packets is interrupted by the transmission of the NACK message, the transmission of the interrupted voice session packets will be delayed and the voice session packets will be transmitted with other voice session packets newly arrived. In above cases, in order to make the compensation, it is required to take into account extra bandwidth when re-allocating and sending the delayed voice session packets and the newly-arrived voice session packets in the frame, to avoid permanent delay introduced by inserting the control commands. If the service packets include both the voice session packets, and the data session packets, when the re-allocation command or NACK message is needed to be transmitted, the transmission of data session packets will be interrupted to release bandwidth for transmitting commands. FIG. 5 is a schematic diagram illustrating a voice session packet transmission and dynamic channel allocation in a Time Division Duplexing (TDD) wireless communication system in accordance with an embodiment of the present invention. In FIG. 5, the base station and the terminal respectively utilize the downlink frame and the uplink frame to transmit the voice session packets, and identify each uplink or downlink voice session packet with a number. The base station dynamically allocates channel number, channel location as well as modulation and encoding mode corresponding to each channel occupied by the voice session packets and the data session packets, according to the voice session packets and data session packets in current frame needed to be sent out and the current channel conditions. The voice session packets needed to be sent out may include at least one of the newly-arrived voice session packets, delayed voice session packets and voice session packets needed to be retransmitted. Meanwhile, after detecting that at least one of the uplink voice session packets is lost, the base station may send a bandwidth re-allocation command to the terminal, which arrives at the terminal not later than the NACK packet including the number of the lost voice session packet. For example, if the second downlink voice session packet D2 is lost, an NACK packet is sent to the base station in the next uplink frame. Once receiving the NACK packet, the base station sends a BandWidth Re-allocation (BWR) command to the terminal to inform the terminal to re-allocate the channel. Thus, the terminal may transmit two voice session packets U2 and U3 in the next uplink frame. And the next downlink frame may be able to send three voice session packets D2, D3 and D4. In addition, the re-allocation of the channel is only valid during the transmission of one frame. The channel may automatically return to the state of the previous bandwidth after the re-allocation. If the fourth uplink voice session packet U4 is lost, the base station immediately sends an NACK packet to the terminal, and triggers the terminal to retransmit the voice session packet U4. The base station will also send the BWR command in a next downlink frame to the terminal for initializing the re-allocation. Thus, the voice session packets D5-D7 may be transmitted in the next downlink frame. The voice session packets U5 and U6 may be sent in an uplink frame. In addition, the re-allocation of the channel is only valid during the transmission of one frame. Obviously, the above transmission solution introduces the jitter of arrival time of the voice session packets. A jitter buffer controller of the terminal may adjust the playback delay, to make the voice encoding packets be replayed in a normal speed consistent with that of the vocoder.

Figure 6:
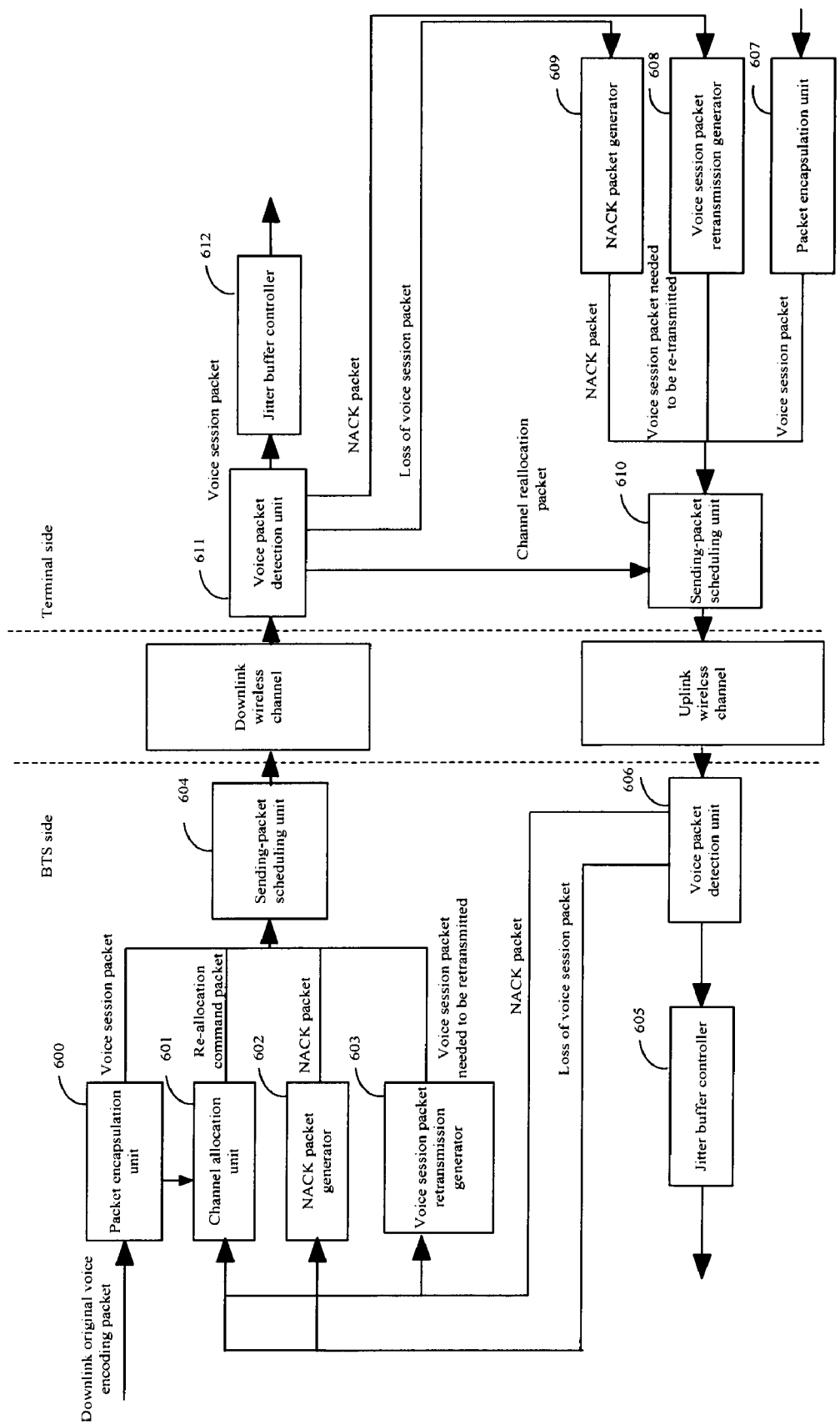
FIG. 6 is a schematic diagram illustrating an improved voice session packet transmission device in accordance with an embodiment of the present invention.

FIG. 6 is a schematic diagram illustrating an improved voice session packet transmission device in accordance with an embodiment of the present invention. At the base station side, a packet encapsulation unit 600 identifies each original voice encoding packet with a number to indicate its playback order, and performs channel encoding on the voice encoding packet identified with the number to convert the voice encoding packet into a voice session packet. A voice session packet retransmission generator 603 generates at least one voice session packet needed to be retransmitted. A channel allocation unit 601 allocates number of channels used for transmitting packets according to the packets needed to be transmitted in a transmission buffer, exchange a voice session establishment request message with the terminal to establish a voice session or voice data mixed session, and generates a re-allocation command packet sent to the terminal. The channel allocation unit determines the number of the first voice session packet, according to the initial number of the voice packet carried in the voice session establishment request message exchanged between the terminal and the base station. The channel allocation unit in the base station dynamically allocates channel number, channel location and a modulation and encoding mode corresponding to each channel occupied by the voice session packets and the data session packets, according to current channel conditions, the voice session packets and data session packets needed to be transmitted in the current frame. The voice session packets needed to be transmitted include newly-arrived voice session packets, delayed voice session packets and voice session packets needed to be retransmitted. The channel allocation unit of the base station also sends a bandwidth re-allocation command to the terminal, to increase uplink or downlink bandwidth. The increased bandwidth will be automatically cancelled after the voiced session packets needed to be retransmitted are sent out, and the base station needs not to send an extra control command packet to the terminal. After a voice packet detection unit 606 detects that a voice session packet from the terminal is lost, an NACK packet generator 602 generates an NACK packet including the number of the lost voice session packet. The newly-arrived voice session packet and delayed voice session packet generated by the packet encapsulation unit 600, re-allocation command packet generated by the channel allocation unit 601, the NACK packet generated by the NACK generator, and the voice session packet needed to be retransmitted generated by the voice session packet retransmission generator are all sent to a sending-packet scheduling unit 604. The sending-packet scheduling unit 604 selects one or more packets for transmission according to predetermined priority and available bandwidth. The order of the priority from high to low is the control command packet, e.g., re-allocation command packet and NACK packet, voice session packets needed to re-transmitted, delayed voice session packets, newly-arrived voice session packets and data session packets. The voice packet detection unit 606 receives and detects voice session packets sent from the terminal, and notifies the NACK packet generator 602 of the voice session packet, the loss of which has been confirmed. The base station side may further include a jitter buffer controller 605, configured to receive proper voice session packets from the voice packet detection unit 606. At the terminal side, a packet encapsulation unit 607, a voice session packet retransmission generator 608, an NACK packet generator 609, a voice packet detection unit 611 and a sending-packet scheduling unit 610 process the voice session packets from the base station. Functions of each of the above units are similar to those at the base station side.

The above method provides a reliable voice session packet transmission mechanism at the expense of delay and delay jitter. Thus, at least one jitter buffer controller 612 needs be deployed at the terminal side. The jitter buffer controller 612 receives proper voice session packets from the voice packet detection unit 611, and adjusts playback delay for each voice session packet. And then, the outputted voice session packets are sent to a voice encoding packet extracting unit for de-encapsulation, to generate original voice encoding packets for a voice encoder.

Figure 7:
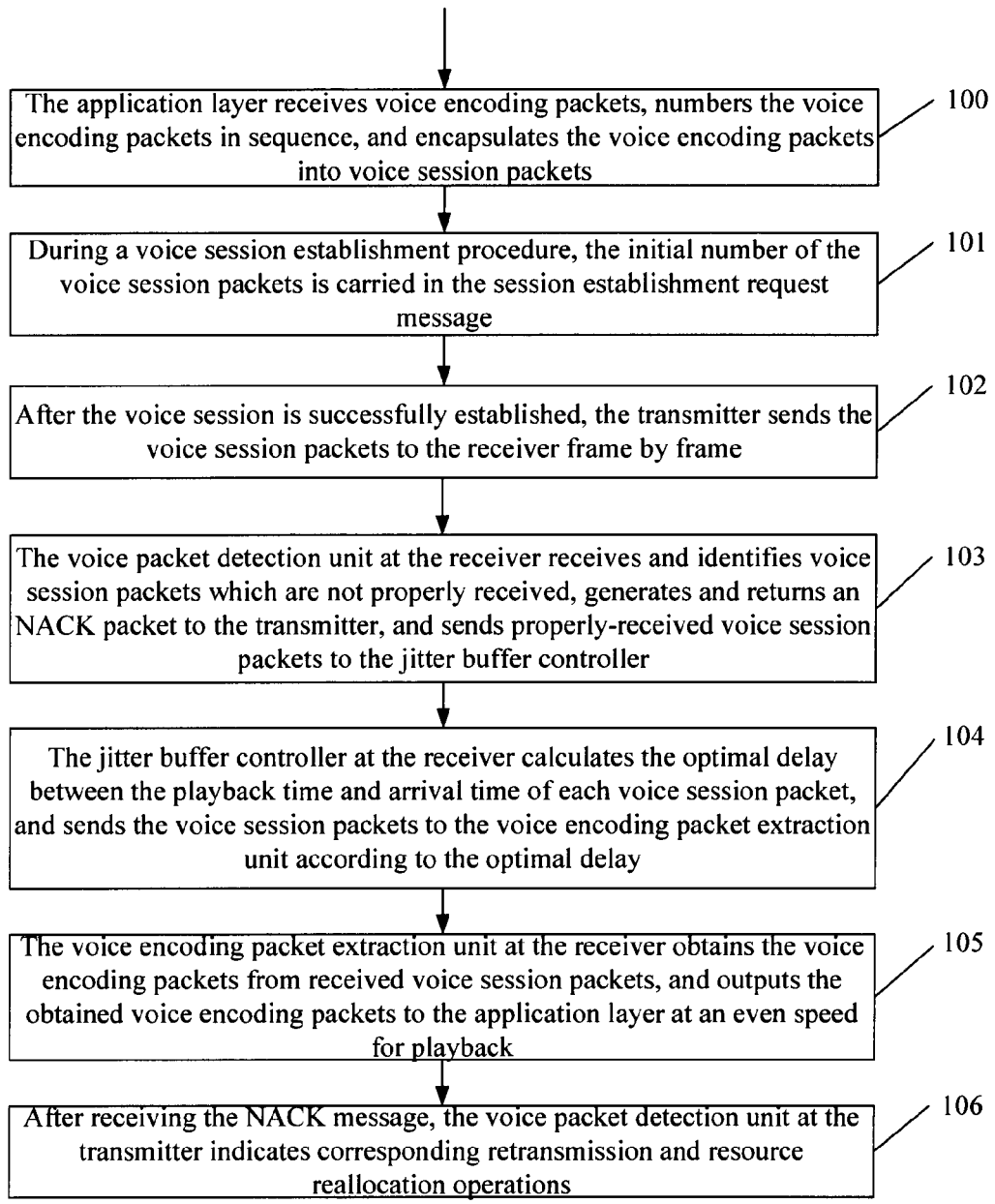
FIG. 7 is an overall processing flowchart illustrating an improved voice session packet transmission method in accordance with an embodiment of the present invention.

FIG. 7 is an overall processing flowchart illustrating an improved voice session packet transmission method in accordance with an embodiment of the present invention. As shown in FIG. 7, the method includes the following blocks.

Block 100: The application layer of the wireless communication system receives original voice encoding packets, numbers the original voice encoding packets in sequence, and performs channel encoding for the numbered original voice encoding packets to encapsulate them into voice session packets.

Figure 8:
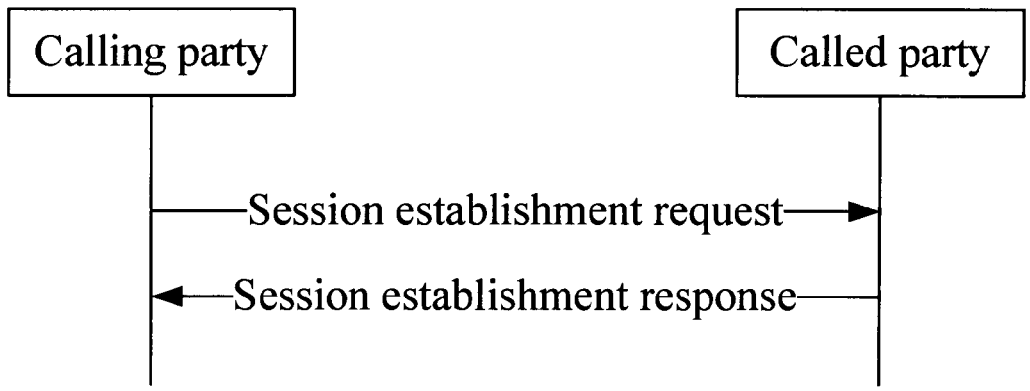
FIG. 8 is a flow chart illustrating a session establishment signaling in accordance with an embodiment of the present invention.

Block 101: During a voice session establishment procedure, an initial number of a voice session packet is carried in a session establishment request message, so that the two parties can unify the number of the first voice session packet. The voice session establishment procedure is shown in FIG. 8. As shown in FIG. 8, the calling party (e.g., the transmitter in the embodiment) initiates a voice session establishment request message to the called party (e.g., the receiver in the embodiment). The voice session establishment request message carries the initial number of the voice session packet. The called party returns a voice session establishment response to the calling party, to establish the voice session.

Block 102: After the voice session is successfully established, the transmitter sends the voice session packets generated in block 100 to the receiver frame by frame. The process for the transmitter sending the voice session packets is shown in FIG. 9.

Figure 9:
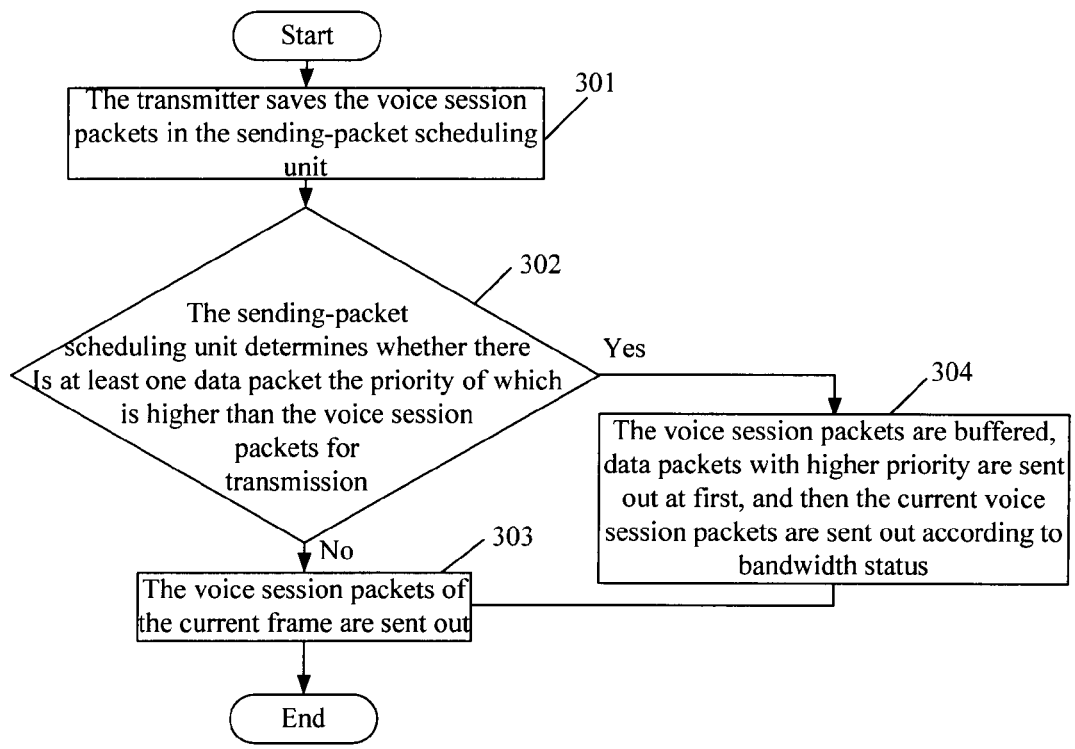
FIG. 9 is a flowchart illustrating the process for sending voice session packets at a transmitter in accordance with an embodiment of the present invention.

FIG. 9 is a flowchart illustrating the process for sending the voice session packets by the transmitter in accordance with an embodiment of the present invention. FIG. 9 includes the following blocks 301~304.

Block 301: The transmitter stores voice session packets in the sending-packet scheduling unit.

Block 302: The sending-packet scheduling unit determines whether there is at least one data packet which is needed to be sent out and has higher priority than the voice session packets. If there is no data packet with higher priority than the voice session packets, block 303 is performed; otherwise, block 304 is performed.

Block 303: The sending-packet scheduling unit sends the current voice session packets to the receiver. Until now, the transmitter has completed a normal procedure for sending the voice session packets.

Block 304: The sending-packet scheduling unit buffers the voice session packets, firstly sends data packets with higher priority than the voice session packets, and then sends the current voice session packets to the receiver according to the bandwidth status.

Block 103: The receiver receives the voice session packets sent from the transmitter, identifies the voice session packets which have not been received and have been improperly received, generates an NACK packet including numbers of the voice session packets which have not been received and have been improperly received, and returns the NACK packet to the transmitter. The process for receiving the voice session packets by the receiver is shown in FIG. 10.

Figure 10:
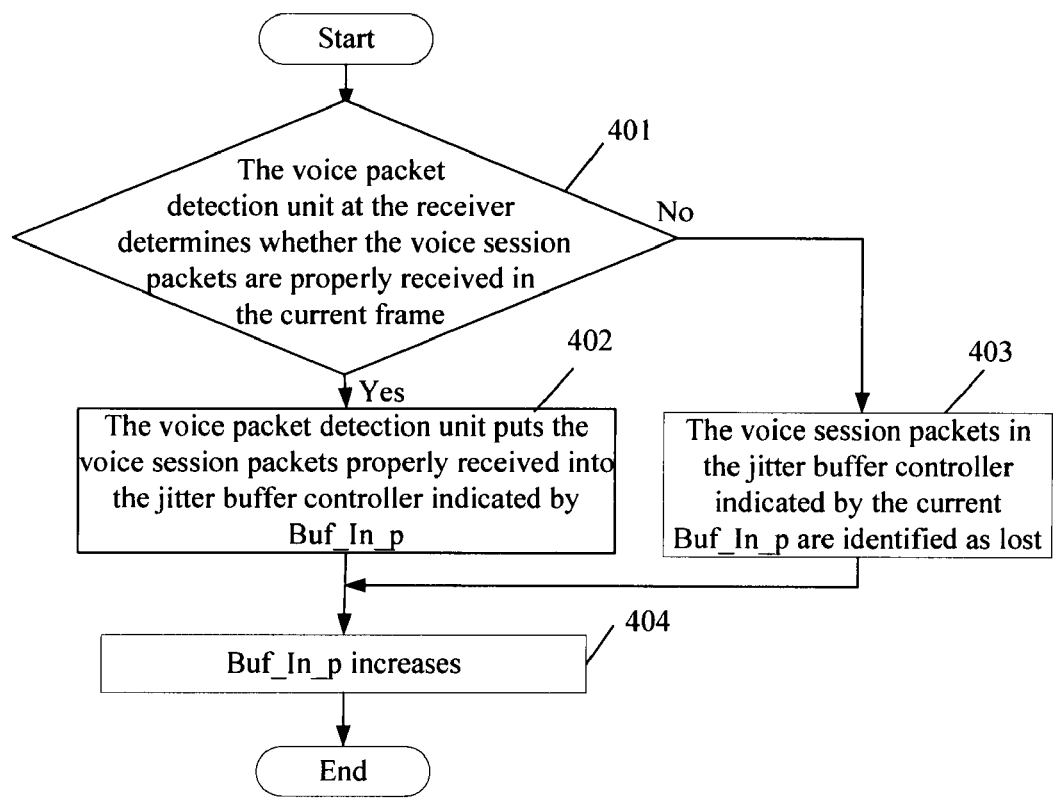
FIG. 10 is a flowchart illustrating the process for receiving voice session packets at a receiver in accordance with an embodiment of the present invention.

FIG. 10 is a flowchart illustrating the process for receiving the voice session packets by the receiver in accordance with an embodiment of the present invention. FIG. 10 includes the following blocks 401~404.

Block 401: The voice packet detection unit at the receiver determines whether the voice session packets sent from the transmitter have been properly received in the current frame. If the voice session packets have been received properly, block 402 is performed; otherwise, block 403 is performed.

Figure 11:
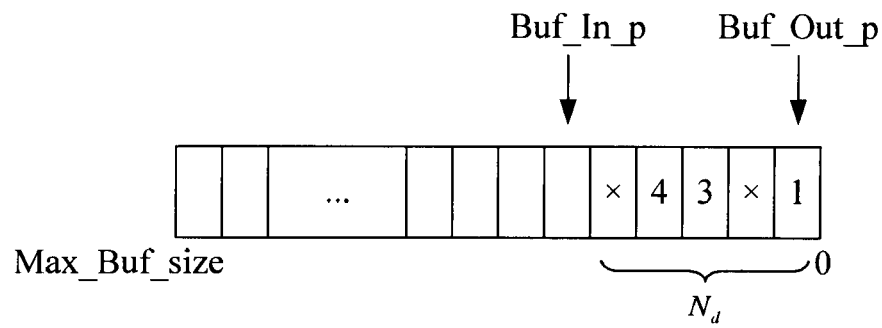
FIG. 11 is a schematic diagram illustrating a jitter buffer controller in accordance with an embodiment of the present invention.
Figure 12:
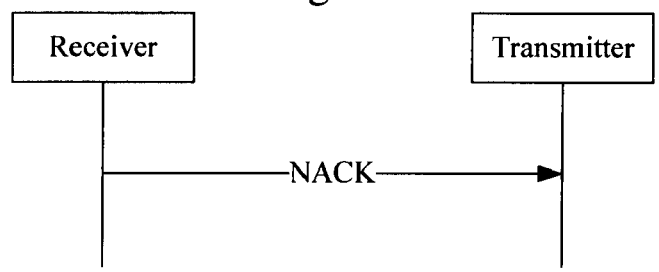
FIG. 12 is a flow chart illustrating the re-transmission of an indication signaling in accordance with an embodiment of the present invention.

Block 402: The voice packet detection unit at the receiver puts the voice session packets properly received into the jitter buffer controller shown in FIG. 11. The voice session packets are put into the jitter buffer controller according to the following rules: performing re-ranking functions according to the number of arrived voice session packet, calculating buffer location Buf_In_p (within a range of 0~Max_Buf_Size-1) corresponding to the number, and putting the voice session packet into the buffer location indicated by the Buf_In_p, and performing block 404.

Block 403: If no voice session packet has been properly received, the voice packet detection unit identifies the voice session packet in the buffer location indicated by the Buf_In_p which corresponds to the number of the voice session packet as lost.

Block 404: One unit is automatically added to Buf_In_p, and the value of Buf_In_p will be set as 0 when the value of Buf_In_p reaches Max_Buf_Size.

Block 104: The jitter buffer controller in the receiver calculates the optimal delay Nd between the playback time and arrival time of each voice session packet. If detecting that the delay between Buf_In_p and Buf_Out_p reaches Nd frames, the jitter buffer controller initiates the sending operation, submits a voice session packet to the voice encoding packet extracting unit according to the number indicated by Buf_Out_p. One unit will be automatically added to the Buf_Out_p each time a voice session packet is submitted. The Buf_Out_p ranges from 0~Max_Buf_Size-1. And the value of Buf_Out_p will be set as 0 if the value of Buf_Out_p reaches Max_Buf_Size.

Block 105: The voice encoding packet extracting unit at the receiver receives and de-encapsulates the voice session packets, to generate the original voice encoding packets. The voice encoding packet extracting unit outputs the original voice encoding packets to the application layer at an even speed for playback, according to designated voice encoding speed. The voice encoding packet extracting unit may also insert one or more synthesized voice encoding packets according to number when there is a loss in the to outputted voice encoding packets, or delete one or more voice encoding packets when there is congestion in the outputted voice encoding packets.

Block 106: After receiving the NACK message, the voice packet detection unit in the transmitter determines whether the current bandwidth resources are available to transmit all the voice session packets needed to be re-transmitted and voice session packets of current frame. If yes, all the voice session packets needed to be re-transmitted and voice session packets of current frame will be sent out; otherwise, the media access layer is requested to execute the resource re-allocation procedure. The voice session packets needed to be re-transmitted and newly-arrived voice session packets will be sent after the resources are successfully allocated.

The foregoing only describes preferred embodiments of the present invention, which is not used for limiting the invention. Any modifications, equivalent substitutions and improvements within the spirit and principle of the invention, should be covered in the protection scope of the invention.

What is claimed is:

1. A method for transmitting voice in a wireless system, comprising:
    identifying, by a transmitter, each original voice encoding packet needed to be sent out with a number indicating playback order, and performing channel encoding on each identified original voice encoding packet to construct a voice session packet;
    establishing a voice session or voice data mixed session between the transmitter and a receiver;
    allocating a channel dynamically for the voice session or the voice data mixed session;
    sending, by the transmitter, newly-arrived voice session packets, delayed voice session packets, voice session packets needed to be re-transmitted, data session packets and control command packets according to pre-configured priority;
    receiving and detecting, by the receiver, the voice session packets, sending an NACK packet comprising number of a lost voice session packet to the transmitter to inform the transmitter to re-transmit the voice session packet, if it is confirmed that the voice session packet is lost;
    if the receiver is a terminal, the method further comprising:
        putting voice session packets properly received into a jitter buffer controller at the receiver;
    wherein when the transmitter or the receiver is at a base station, allocating the channel dynamically for the voice session or the voice data mixed session comprises:
        allocating dynamically, by the base station, channel number, channel location, and a modulation and encoding mode corresponding to each channel occupied by the voice session packets and the data session packets, according to a channel condition, the voice session packets needed to be sent out and data session packets in a frame;
        wherein the voice session packets needed to be sent out comprises at least one of:
        the newly-arrived voice session packets, delayed voice session packets and voice session packets needed to be re-transmitted.

2. The method according to claim 1, wherein a length ratio of the original voice encoding packet and the voice session packet is greater than or equal to 0.70.

3. The method according to claim 1, wherein establishing the voice session or voice data mixed session between the transmitter and the receiver comprises:
    carrying an initial number of the voice session packets in a session establishment request message, to make the transmitter and the receiver determine the number of a first voice session packet.

4. The method according to claim 1, wherein when the transmitter or the receiver is a base station, allocating the channel dynamically for the voice session or the voice data mixed session comprises:
    sending, by the base station, a BandWidth Re-allocation (BWR) command packet to the terminal for increasing uplink or downlink bandwidth; wherein
    increased bandwidth is automatically cancelled after voice session packets needed to be re-transmitted are sent out.

5. The method according to claim 1, wherein when the transmitter or the receiver is a base station, allocating the channel dynamically for the voice session or the voice data mixed session comprises:
    sending, by the base station, a BandWidth Re-allocation (BWR) command to the terminal after detecting that at least one uplink voice session packet is lost, wherein
    the BWR command arrives at the terminal no later than the NACK packet comprising the number of the lost voice session packet.

6. The method according to claim 1, wherein the order of the pre-configured priority from high to low is: the control command packets, voice session packets needed to be re-transmitted, delayed voice session packets, newly-arrived voice session packets and data session packets.

7. The method according to claim 1, further comprising:
    confirming a loss of the voice session packet using a receiving Signal to Noise Ratio (SNR) or an error detection code checksum.

8. The method according to claim 1, further comprising:
    outputting, by the jitter buffer controller, the properly-received voice session packets to a voice encoding packet extracting unit; and
    de-encapsulating, by the voice encoding packet extracting unit, the properly-received voice session packets to obtain original voice encoding packets, and outputting the original voice encoding packets to an application layer of the wireless system at an even speed.

9. A device for transmitting voice in a wireless system, comprising:
    a packet encapsulation unit set in a base station and a terminal, configured to identify each original voice encoding packet needed to be sent out with a number indicating playback order, and perform channel encoding on each identified original voice encoding packet to construct a voice session packet;
    a voice session packet retransmission generator set in the base station and the terminal, configured to generate at least one voice session packet needed to be re-transmitted;
    a channel allocation unit set in the base station, configured to exchange a voice session establishment request message with the terminal to establish a voice session or a voice data mixed session, and dynamically allocate a channel;
    a sending-packet scheduling unit set in the base station and the terminal, configured to send newly-arrived voice session packets, delayed voice session packets, voice session packets needed to be re-transmitted, data session packets and control command packets according to a pre-configured priority;

a voice packet detection unit set in the base station and the terminal, configured to receive and detect the voice session packets, notify an NACK packet generator of a lost voice session packet if it is confirmed that the voice session packet is lost, and the voice packet detection unit set in the terminal is configured to send voice session packets properly received to a jitter buffer controller; and the NACK packet generator set in the base station and the terminal, configured to generate an NACK packet comprising number of the lost voice session packet, and send the NACK packet to a transmitter, a voice session packet sent from which is the lost voice session packet to instruct the transmitter to retransmit the voice session packet;

wherein the channel allocation unit set in the base station dynamically allocates channel number, channel location, and a modulation and encoding mode corresponding to each channel occupied by the voice session packets and the data session packets, according to channel conditions, the voice session packets needed to be sent out and the data session packets in a frame; wherein the voice session packets needed to be sent out comprise the newly-arrived voice session packets, delayed voice session packets and voice session packets needed be re-transmitted.

10. The device according to claim 9, wherein a length ratio of the original voice encoding packet and the voice session packet in the packet encapsulation unit is greater than or equal to 0.70.

11. The device according to claim 9, wherein the channel allocation unit determines number of a first voice session packet according to an initial number of voice session packets carried in the voice session establishment request message exchanged between the base station and the terminal.

12. The device according to claim 9, wherein the channel allocation unit in the base station sends a Band-Width Re-allocation (BWR) command to the terminal for increasing uplink or downlink bandwidth, and the increased bandwidth is automatically cancelled after the voice session packets needed to be re-transmitted are sent out.

13. The device according to claim 9, wherein the channel allocation unit in the base station sends a BWR command to the terminal after detecting that an uplink voice session packet is lost, and the BWR command arrives at the terminal no later than the NACK packet comprising the number of the lost voice session packet.

14. The device according to claim 9, wherein the order of the pre-configured priority from high to low is: the control command packets, voice session packets needed to be re-transmitted, delayed voice session packets, newly-arrived voice session packets and data session packets.

15. The device according to claim 9, wherein the voice packet detection unit confirms that the voice session packet is lost using a receiving Signal to Noise Ratio (SNR) or an error detection code checksum.

16. The device according to claim 9, wherein the jitter buffer controller set at the terminal is configured to output the properly-received voice session packets from the voice packet detection unit to a voice encoding packet extracting unit, and the voice encoding packet extracting unit is configured to de-encapsulate the properly-received voice session packets to obtain original voice encoding packets, and output the original voice encoding packets to an application layer of the wireless system at an even speed.

* * * * *